United States Patent
Ishiwata (10) Patent No.: US 7,107,586 B2
(45) Date of Patent: Sep. 12, 2006

(54) INTERMEDIATE OBJECT LINKING METHOD AND UNIT

(75) Inventor: Atsushi Ishiwata, Chiba (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 553 days.

(21) Appl. No.: 09/916,168

(22) Filed: Jul. 26, 2001

(65) Prior Publication Data

US 2002/0016957 A1    Feb. 7, 2002

(30) Foreign Application Priority Data

Aug. 7, 2000   (JP)   ............. P. 2000-238729

(51) Int. Cl.
*G06F 9/44*   (2006.01)
(52) U.S. Cl. .................................. 717/162
(58) Field of Classification Search ........ 717/162–167, 717/140, 159–161
See application file for complete search history.

(56) References Cited

U.S. PATENT DOCUMENTS

| | | | | |
|---|---|---|---|---|
| 5,212,794 | A | * | 5/1993 | Pettis et al. ................. 717/153 |
| 5,740,446 | A | | 4/1998 | Fujiwara |
| 5,740,447 | A | * | 4/1998 | Kurahashi .................. 717/159 |
| 5,790,865 | A | * | 8/1998 | Smaalders et al. .......... 717/158 |
| 6,185,578 | B1 | * | 2/2001 | Yokote et al. .............. 717/163 |
| 6,542,167 | B1 | * | 4/2003 | Darlet et al. ................ 717/151 |

FOREIGN PATENT DOCUMENTS

| | | |
|---|---|---|
| JP | 3-37780 A | 2/1991 |
| JP | 6-168011 A | 6/1994 |
| JP | 07-110768 | 4/1995 |
| JP | 07-121102 | 5/1995 |
| JP | 08-101777 | 4/1996 |
| JP | 8/137684 A | 5/1996 |

OTHER PUBLICATIONS

Pettis et al.; "Profile Guided Code Positioning"; Hewlett-Packard Company; ACM, Conference on Programming Language Design and Implementation; 1990; pp. 16-27.*
David E. Goldberg, "Genetic algorithms", in AccessScience@McGraw-Hill, http://www.accessscience.com, DOI 10.1036/1097-8542.757293, last modified: Sep. 30, 2003.*
Donald A. Pierre, "Optimization", in AccessScience@McGraw-Hill, http://www.accessscience.com, DOI 10.1036/1097-8542. 474000, last modified: Sep. 30, 2003.*
Patent Abstracts of Japan, Publication No. 08-101777, machine translation of detailed description on Feb. 17, 2005.*

* cited by examiner

*Primary Examiner*—Kakali Chaki
*Assistant Examiner*—William H. Wood
(74) *Attorney, Agent, or Firm*—Pearne & Gordon LLP (57) ABSTRACT

A linking order forming section forms linking orders of intermediate objects. A linker starting section starts a linker based on the linking order that is formed by applying a genetic algorithm, etc. to form an executable object. A comparing section compares a program size of the formed executable object with the minimum value stored in a storing section. If the program size is smaller than the minimum value, the storing section stores this program size as the minimum value and also stores the linking order at that time. The linking order that can provide the minimum program size can be obtained effectively without the manual intervention by repeating a series of steps by using a repeating section.

15 Claims, 6 Drawing Sheets

INTERMEDIATE OBJECT LINKING METHOD AND UNIT

FIELD OF THE INVENTION

The present invention relates to an intermediate object linking method of linking a plurality of intermediate objects to form an executable object, and an intermediate object linking unit, and a linker unit and a compiler driving unit, and a storing medium technology for recording a program used to link the intermediate objects.

BACKGROUND OF THE INVENTION

An intermediate object linking method in the background art will be explained with reference to FIG. 6.

Figure 6:
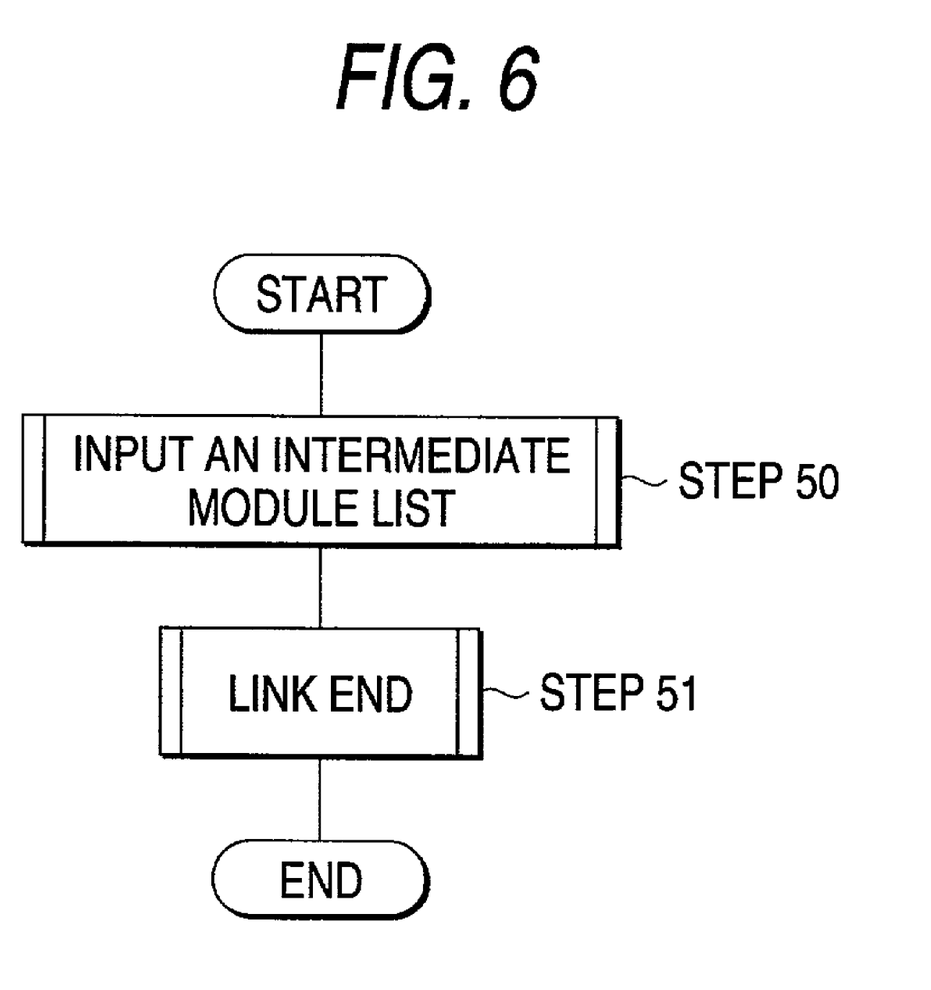
FIG. 6 is a flowchart of an intermediate object linking method in the background art.

FIG. 6 is a flowchart of the intermediate object linking method in the background art. First, a list of intermediate objects as linked object is input (step 50). Then, the linking process such as the linking of the intermediate objects, etc. are executed in compliance with the order in the list of the intermediate objects input in step 50 to form an executable object.

Then, the CPU that has a plurality of adressings for the memory access holds a plurality of branch instructions in response to branch distances in the formed executable object.

Here, the program size of the branch instruction is different based on the branch distance. More particularly, the program size of the branch instruction is increased larger as the branch distance becomes longer. In addition, since this branch distance is changed according to the linking order when the intermediate objects are linked, sometimes the program size of the executable object containing the branch instruction is changed according to this linking order.

In general, the smaller program size is preferable. Therefore, the designer must prepare a number of linking orders of the intermediate objects, then form the executable object by executing the linking process such as the linking of the intermediate objects, etc. sequentially, and then search the linking order of the intermediate objects which permits the minimum program size of the executable object.

In the method in the background art, there are several problems to search the linking order of the intermediate objects that permits the minimum program size of the executable object.

First, the first problem is that, since the examination of the linking order of the intermediate objects is manually carried out, such examination to get the executable object of the minimum size takes much time and labor.

Then, the next problem is that, since the combination of the linking order of the intermediate objects is large in number, it takes a lot of time and it is very difficult to decide the linking order of the intermediate objects that can form the executable object of the minimum size. If the number of the intermediate objects is N, a total number of the linking order of the intermediate objects is increased up to N! (factorial).

SUMMARY OF THE INVENTION

The present invention has been made in view of such circumstances, and it is an object of the present invention to provide an intermediate object linking method capable of easily forming an executable object having a minimum size, an intermediate object linking unit, a linker unit, a compiler driving unit, and a storing medium for recording a program used to link the intermediate objects.

In order to achieve the above object, a first intermediate object linking method provides an intermediate object linking method of linking a plurality of intermediate objects to form an executable object, that comprises:

an intermediate object linking order forming step which decides linking orders of the plurality of intermediate objects;

a linking processing step which executes linking processes of the plurality of intermediate objects based on the linking orders decided by the intermediate object linking order forming step to get an executable object;

a comparing step which compares program size of the executable objects obtained by the linking processing step with the program size of a executable objects stored in a storing section every time when the linking order is changed;

a storing step for storing the program size of the executable objects and the linking order obtained by the linking processing step in the storing section to update when the program size of the executable objects obtained by the linking processing step is smaller than the program size of the executable objects stored in the storing section at the comparing step; and a repeating step for changing the linking orders by the intermediate object linking order forming step and executing repeatedly the linking processing step, the comparing step, and the storing step.

According to the intermediate object linking method, even if there are a large number of combinations of the linking orders of the intermediate objects, the linking order of the intermediate object that can provide the minimum program size can be easily obtained since the linking order used when the program size is minimum is stored in the storing step.

In a second intermediate object linking method, the intermediate object linking order forming step decides the linking orders by a permutation algorithm.

According to the intermediate object linking method, since all linking orders of the intermediate objects can be formed effectively by the permutation, the linking order of the intermediate object that can provide the minimum program size can be easily obtained.

In a third intermediate object linking method, the intermediate object linking order forming step decides the linking orders by a genetic algorithm.

According to the intermediate object linking method, even if there are a large number of linking orders of the intermediate objects, the linking order of the intermediate object that can provide the minimum program size can be effectively obtained at the high speed by applying the genetic algorithm.

A first intermediate object linking unit provides an intermediate object linking unit for linking a plurality of intermediate objects to form an executable object, that comprises:

an intermediate object linking order forming section which decides linking orders of the plurality of intermediate objects;

a linker starting section which executes linking processes of the plurality of intermediate objects based on the linking orders decided by the intermediate object linking order forming section to form an executable object;

a comparing section which compares program size of the executable objects every time when the linking order is changed;

a storing section which stores the program size of the executable objects and the linking order; and a repeating section which changes the linking orders by the intermediate object linking order forming section and operating repeatedly the linker starting section, the comparing section, and the storing section, wherein the comparing section compares the program size of the executable objects formed by the linker starting section with the program size of the executable objects stored in the storing section, wherein the storing section stores the program size of the executable objects and the inking order formed by the linker starting section when the program size of the executable objects formed by the linker starting section is smaller than the program size of the executable objects stored in the storing section at the comparison by the comparing section.

According to the intermediate object linking unit, since no manual intervention is needed in the examination of the linking order of the intermediate objects, it does not take much time and labor to get the executable object having the minimum size.

Also, even if a large number of combinations of the linking order of the intermediate objects are present, the linking order of the intermediate object that can provide the minimum program size can be readily obtained since the linking order used when the program size is minimum is stored in the storing section.

In a second intermediate object linking unit, the intermediate object linking order forming section decides the linking orders by a permutation algorithm.

According to the intermediate object linking unit, since all linking orders of the intermediate objects can be formed effectively by the permutation, the linking order of the intermediate object that can provide the minimum program size can be easily obtained.

In a third intermediate object linking unit, the intermediate object linking order forming section decides the linking orders by a genetic algorithm.

According to the intermediate object linking unit, even if there are a large number of linking orders of the intermediate objects, the linking order of the intermediate object that can provide the minimum program size can be effectively obtained at the high speed by applying the genetic algorithm.

A first linker unit provides a linker unit for linking a plurality of intermediate objects to form an executable object, that comprises:

an intermediate object linking order forming section which decides linking orders of the plurality of intermediate objects;

a linking processing section which executes linking processes of the plurality of intermediate objects based on the linking orders decided by the intermediate object linking order forming section to form an executable object;

a comparing section which compares program size of the executable objects every time when the linking order is changed;

a storing section which stores the program size of the executable objects and the linking order; and a repeating section which changes the linking orders by the intermediate object linking order forming section and operating repeatedly the linker starting section, the comparing section, and the storing section, wherein the comparing section compares the program size of the executable objects formed by the linker starting section with the program size of the executable objects stored in the storing section, wherein the storing section stores the program size of the executable objects and the inking order formed by the linker starting section when the program size of the executable objects formed by the linker starting section is smaller than the program size of the executable objects stored in the storing section at the comparison by the comparing section.

According to the linker unit, since no manual intervention is needed in the examination of the linking order of the intermediate objects, it does not take much time and labor to get the executable object having the minimum size.

Also, even if a large number of combinations of the linking order of the intermediate objects are present, the linking order of the intermediate object that can provide the minimum program size can be readily obtained since the linking order used when the program size is minimum is stored in the storing section.

In a second linker unit, the intermediate object linking order forming section decides the linking orders by a permutation algorithm.

According to this linker unit, since all linking orders of the intermediate objects can be formed effectively by the permutation, the linking order of the intermediate object that can provide the minimum program size can be easily obtained.

In a third linker unit, the intermediate object linking order forming section decides the linking orders by a genetic algorithm.

According to this linker unit, even if there are a large number of linking orders of the intermediate objects, the linking order of the intermediate object that can provide the minimum program size can be effectively obtained at the high speed by applying the genetic algorithm.

A first compiler driving unit provides a compiler driving unit for translating a source program by starting a compiler, an assembler, a linker, etc. to form an executable object, that comprises:

an intermediate object linking order forming section which decides linking orders of the plurality of intermediate objects;

a linker starting section which executes linking processes of the plurality of intermediate objects based on the linking orders decided by the intermediate object linking order forming section to form an executable object;

a comparing section which compares program size of the executable objects every time when the linking order is changed;

a storing section which stores the program size of the executable objects and the linking order; and a repeating section which changes the linking orders by the intermediate object linking order forming section and operating repeatedly the linker starting section, the comparing section, and the storing section, wherein the comparing section compares the program size of the executable objects formed by the linker starting section with the program size of the executable objects stored in the storing section, wherein the storing section stores the program size of the executable objects and the inking order formed by the linker starting section when the program size of the executable objects formed by the linker starting section is smaller than the program size of the executable objects stored in the storing section at the comparison by the comparing section.

According to the compiler driving unit, since no manual intervention is needed in the examination of the linking order of the intermediate objects, it does not take much time and labor to get the executable object having the minimum size.

Also, even if a large number of combinations of the linking order of the intermediate objects are present, the linking order of the intermediate object that can provide the minimum program size can be readily obtained since the linking order used when the program size is minimum is stored in the storing section.

In a second compiler driving unit, the intermediate object linking order forming section decides the linking orders by a permutation algorithm.

According to the compiler driving unit, since all linking orders of the intermediate objects can be formed effectively by the permutation, the linking order of the intermediate object that can provide the minimum program size can be easily obtained.

In a third compiler driving unit, the intermediate object linking order forming section decides the linking orders by a genetic algorithm.

According to the compiler driving unit, even if there are a large number of linking orders of the intermediate objects, the linking order of the intermediate object that can provide the minimum program size can be effectively obtained at the high speed by applying the genetic algorithm.

A first recording medium provides a recording medium for recording a program for linking a plurality of intermediate objects to form an executable object, wherein the program for causing a computer to execute a method comprising:

an intermediate object linking order forming step which decides linking orders of the plurality of intermediate objects;

a linking processing step which executes linking processes of the plurality of intermediate objects based on the linking orders decided by the intermediate object linking order forming step to get an executable object;

a comparing step which compares program size of the executable objects obtained by the linking processing step with the program size of a executable objects stored in a storing section every time when the linking order is changed;

a storing step for storing the program size of the executable objects and the linking order obtained by the linking processing step in the storing section to update when the program size of the executable objects obtained by the linking processing step is smaller than the program size of the executable objects stored in the storing section at the comparing step; and a repeating step for changing the linking orders by the intermediate object linking order forming step and executing repeatedly the linking processing step, the comparing step, and the storing step.

According to this recording medium, since no manual intervention is needed in the examination of the linking order of the intermediate objects, it does not take much time and labor to get the executable object having the minimum size.

Also, even if a large number of combinations of the linking order of the intermediate objects are present, the linking order of the intermediate object that can provide the minimum program size can be readily obtained since the linking order used when the program size is minimum is stored in the storing section.

In a second recording medium, the intermediate object linking order forming step decides the linking orders by a permutation algorithm.

According to this recording medium, since all linking orders of the intermediate objects can be formed effectively by the permutation, the linking order of the intermediate object that can provide the minimum program size can be easily obtained.

In a third recording medium, the intermediate object linking order forming step decides the linking orders by a genetic algorithm.

According to this recording medium, even if there are a large number of linking orders of the intermediate objects, the linking order of the intermediate object that can provide the minimum program size can be effectively obtained at the high speed by applying the genetic algorithm.

DETAILED DESCRIPTION OF THE PREFERRED EMBODIMENTS (Embodiment 1)

Configurations of an intermediate object linking unit and peripheral devices according to the present embodiment will be explained with reference to FIG. 1.

Figure 1:
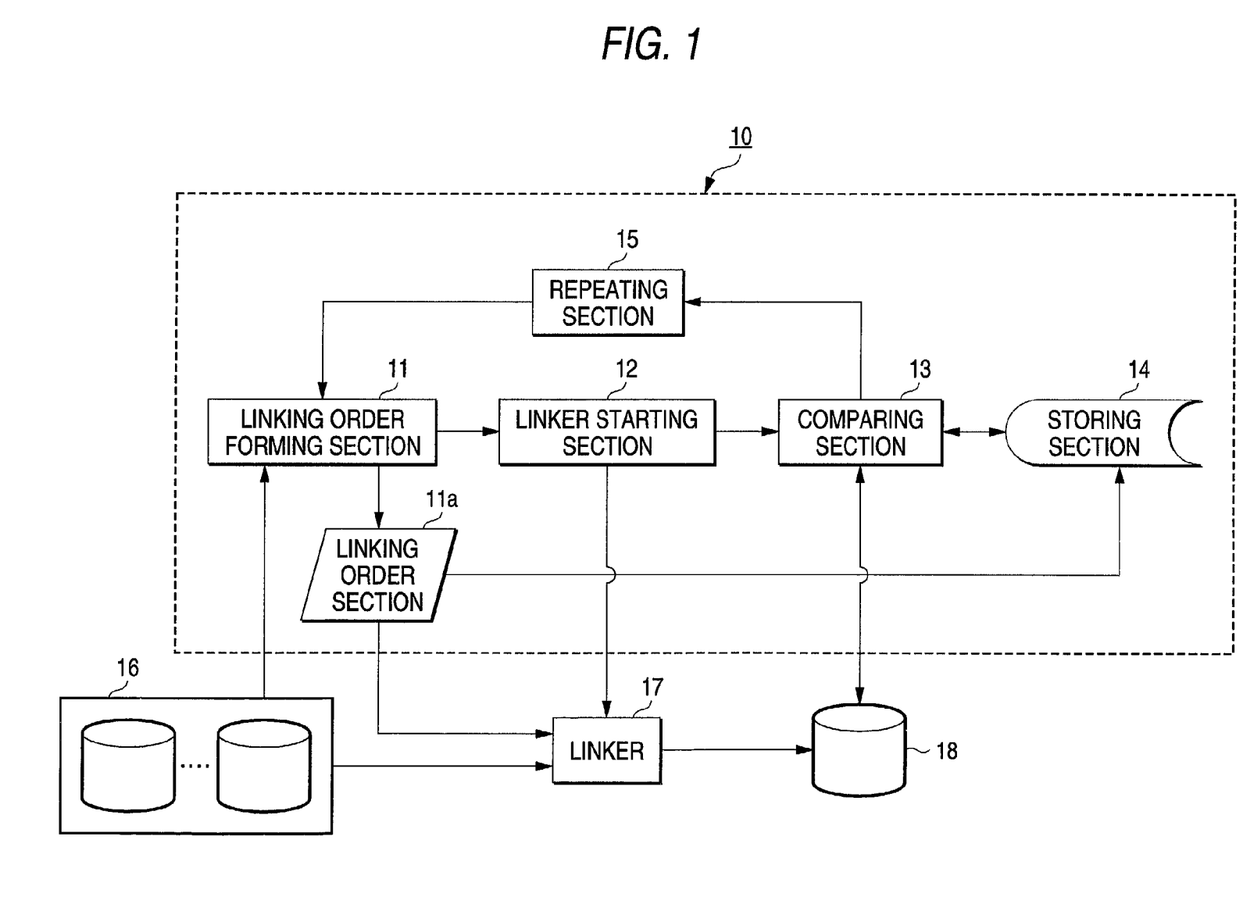
FIG. 1 is a view showing configurations of an intermediate object linking unit and peripheral devices according to a first embodiment.

FIG. 1 is a view showing configurations of an intermediate object linking unit and peripheral devices according to a first embodiment.

The intermediate object linking unit 10 comprises a linking order forming section 11 as an intermediate object linking order forming means, a linker starting section 12 as a linker starting means, a comparing section 13 as a comparing means, a storing section 14 as a storing means, and a repeating section 15 as a repeating means.

The linking order forming section 11 is a unit for forming the linking order of intermediate objects 16. The linking order formed by the linking order forming section 11 is held by a linking order section 11a until the next linking order is formed. A linker starting section 12 starts a linker 17 based on the linking order held by the linking order section 11a and causes it to execute the linking process, and thus an executable object 18 is formed.

Also, the linking order forming section 11 forms the linking order by using a permutation algorithm, a genetic algorithm, etc. that are described later.

The linker starting section 12 starts the linker 17 based on the linking order formed by the linking order forming section 11 and causes it to execute the linking process, whereby the executable object 18 is formed.

A comparing section 13 compares a program size of the executable object 18 formed by the linker 17 with program sizes of the executable objects stored in a storing section 14.

The storing section 14 stores the smaller program size according to the comparison by the comparing section 13, and updates the program size. Then, the storing section 14 stores the minimum program size out of the formed executable objects 18, by repeating respective steps by a repeating section 15 described later. Also, upon updating the program size to the smaller size and recording it, the storing section 14 stores the linking order used when the executable object 18 having the program size is obtained.

Accordingly, the smallest program size and the linking order of the intermediate objects 16 when the executable object 18 having the minimum program size is obtained are stored in the storing section 14.

Also, it is preferable that an initial value of the program size should be input previously at the initial stage of the storing section 14. For example, a value having a size that is unavailable as the program size may be input as the initial value.

The repeating section 15 is a unit that causes the linking order forming section 11, the linker starting section 12, the comparing section 13, and the storing section 14 to repeat a series of steps by returning the step to the linking order forming section 11 again after the comparison in the comparing section 13.

The above is the internal configuration of the intermediate object linking unit 10.

As the peripheral devices of the intermediate object linking unit 10, there exist the intermediate object 16 and the linker 17, and the executable object 18.

The executable object 18 contains the branch instruction, and this branch instruction has the different program size according to the branch distance. Also, if this branch distance is longer, the program size of the executable object becomes larger.

Also, since the branch distance is changed according to the linking order of the intermediate objects 16, the program size of the executable object 18 is changed based on the linking order of the intermediate objects 16.

The above is the configuration of the peripheral devices of the intermediate object linking unit 10. Then, the case where the permutation algorithm is applied to the above intermediate object linking unit 10 and the case where the genetic algorithm is applied to the same will be explained hereunder.

(1) The case where a permutation algorithm is applied:

Then, operations taken in the case where the permutation algorithm is applied to the above intermediate object linking unit 10 will be explained with reference to FIG. 2.

Figure 2:
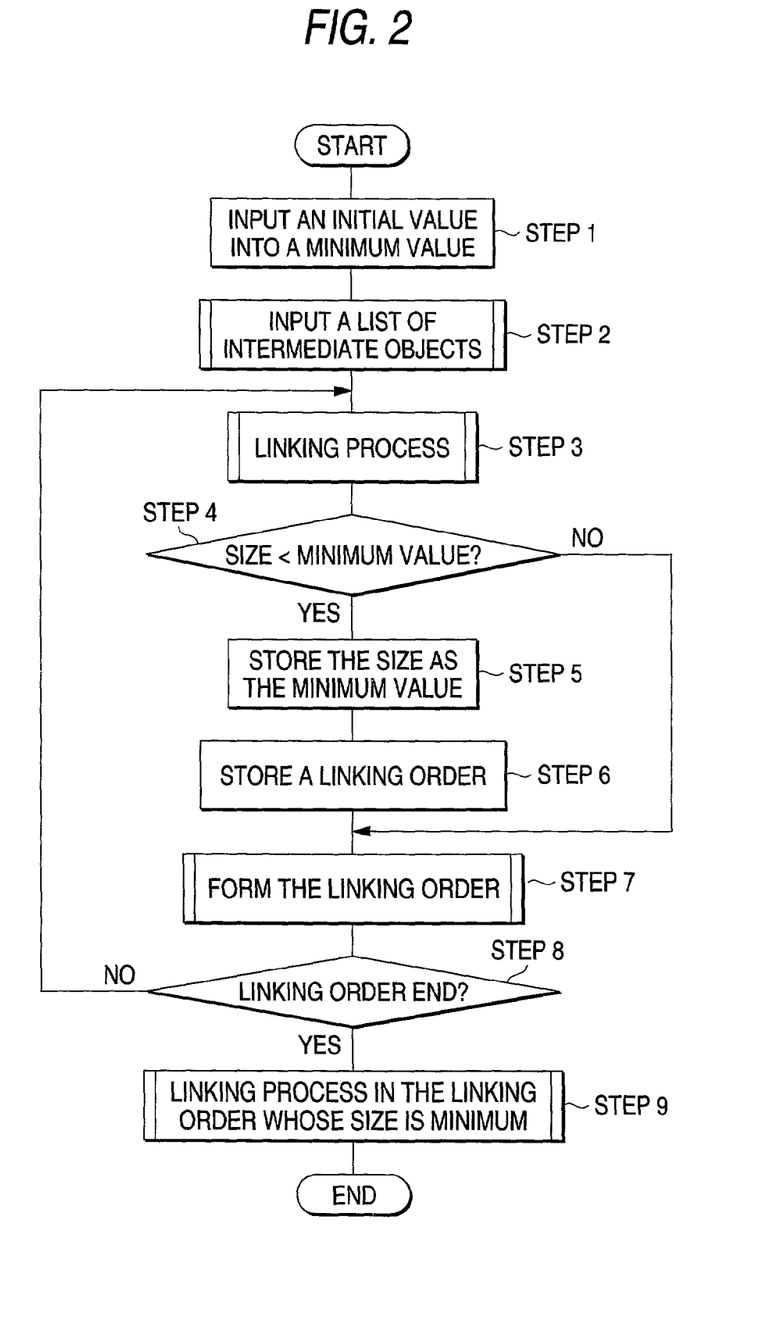
FIG. 2 is a flowchart executed when a permutation algorithm is applied to the intermediate object linking unit.

FIG. 2 is a flowchart executed when the permutation algorithm is applied to the intermediate object linking unit.

First, an initial value as a minimum value of the program size stored in the storing section 14 is input (step 1). A list of the intermediate objects 16 is input (step 2). In this case, the initial value and the list are input by an input unit (not shown).

Then, the linker 17 executes the linking process such as the linking of the intermediate objects 16, etc. based on the linking order which is formed first by the linking order forming section 11 to get the executable object 18 (step 3).

Then, the program size of the executable object 18 formed in step 3 and the minimum value (initial value) of the program size stored in the storing section 14 are compared with each other by the comparing section 13 (step 4). If the program size is not smaller than the minimum value, the process goes to step 7.

Since the initial value as a minimum value is a sufficiently large value and thus the program size is smaller than the minimum value (initial value), the process goes to step 5.

Since the program size is smaller than the minimum value (initial value), this program size is recorded as the minimum value in the storing section 14 and is updated (step 5). Then, the linking order for this recorded program size is read out from the linking order section 11a, and then the linking order at this time is recorded in the storing section 14 (step 6).

Then, the process is returned to the linking order forming section 11 by the repeating section 15, and then the subsequent linking order is formed (updated) based on the permutation algorithm (step 7).

Where the permutation algorithm is an algorithm that calculates sequentially or switches sequentially all permutations that can be achieved by the permutations. For example, the case where the permutation algorithm is applied to the decision of the linking order of the intermediate objects 16 will be considered hereunder. In case the number of the intermediate objects 16 is N and also the linking orders for linking all intermediate objects 16 are derived, the linking order in the N! (factorial) way can be calculated if the linking order of the N intermediate objects 16 is assumed as the permutation.

The explanation will be returned to the flowchart.

After step 7, the process is returned to step 3 (step 8), wherein the linking process is carried out and the executable object is formed by repeating step 3 to step 7. In this step 8, it is decided whether or not all linking orders are formed by the linking order forming section 11.

In step 8, if the formation of all linking orders is finished, the minimum program size out of the executable objects 18 formed according to all the linking orders and the linking order at that time (at the time of minimum) are stored in the storing section 14. Therefore, the executable object 18 that provides the minimum program size can be formed by executing the linking process of the intermediate objects 16 using the linking order at this time of minimum (step 9).

Therefore, according to this intermediate object linking unit 10, since no manual intervention is needed in the examination of the linking order of the intermediate objects 16, it does not take much time and labor to get the executable object 18 having the minimum size.

Also, even if a large number of combinations of the linking order of the intermediate objects 16 are present, all linking orders of the intermediate objects 16 can be effectively formed by using the permutation and the linking order used when the program size is minimum is stored in the storing section 14. Therefore, the linking order of the intermediate object 16 that can provide the minimum program size can be readily obtained.

(2) The case where a genetic algorithm is applied:

Then, operations taken in the case where the genetic algorithm is applied to the above intermediate object linking unit 10 will be explained with reference to FIG. 3.

Figure 3:
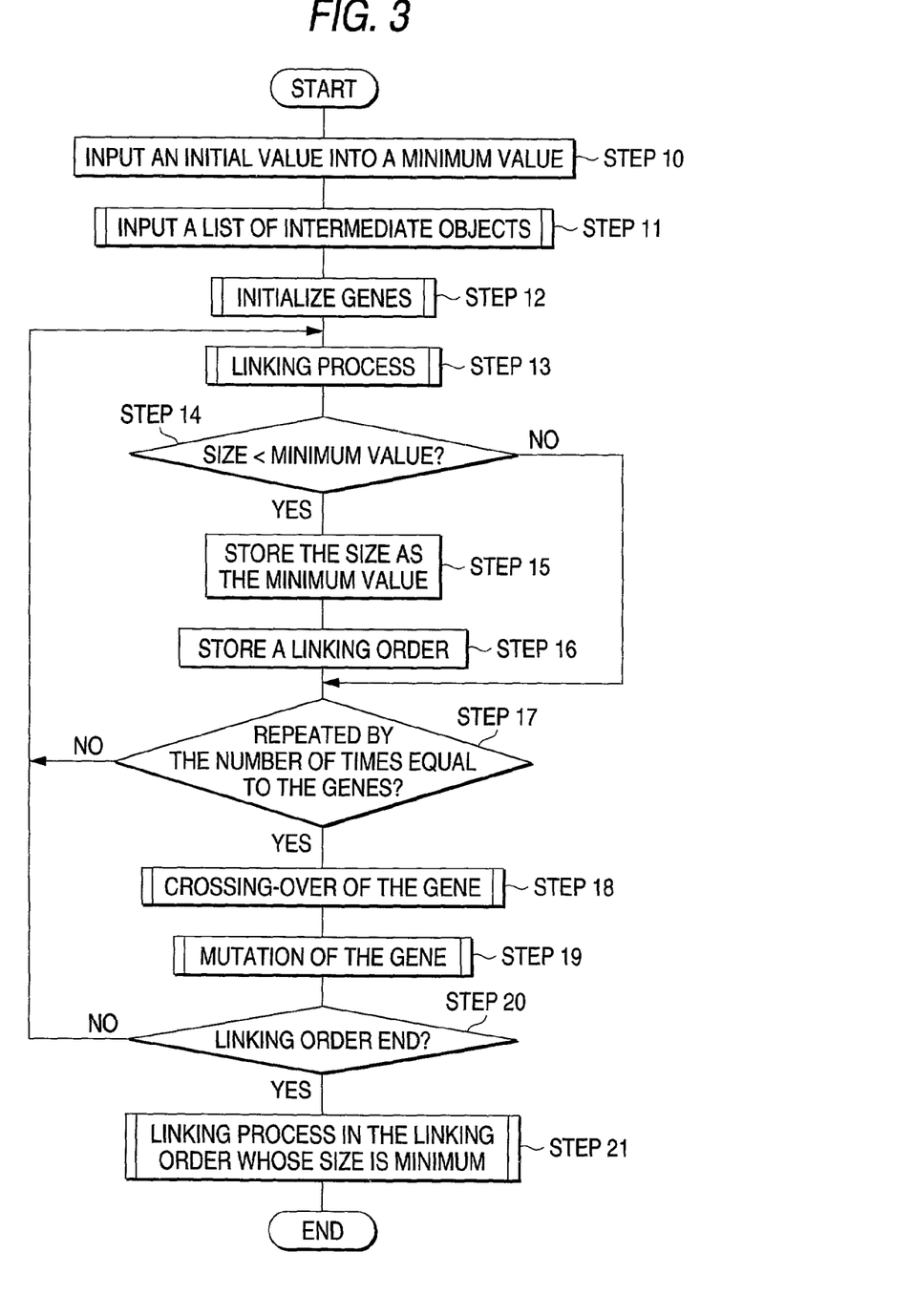
FIG. 3 is a flowchart executed when a genetic algorithm is applied to the intermediate object linking unit.

FIG. 3 is a flowchart executed when the genetic algorithm is applied to the intermediate object linking unit.

Where the genetic algorithm means an algorithm to which gene models created by using chromosomes and genomes of living things are applied. In the heredity of the living thing, the gene manipulation such as selection, crossing-over, mutation, etc. is performed when the gene in one generation is inherited to the next generation. Also, the gene is evaluated by the evaluation function based on the gene model, and has a certain evaluation value. Then, the gene executes the gene manipulation to make this evaluation value higher, and tries to get the higher evaluation value.

Also, it is possible to say that the gene manipulating methods to increase the evaluation value, i.e., methods such as selection, crossing-over, mutation, etc. to increase the evaluation value are the optimal solution to get the high evaluation value in the gene model.

Accordingly, in the models that have various variations in the large scale, the genetic algorithm is such an algorithm that can get the optimal solution of this variation.

If the genetic algorithm is applied to the industrial model, the gene can be expressed by the character string (containing the sequence of numbers), for example. Also, the selection is to delete the character string having the low evaluation value and to employ the character string having the high evaluation value, and the crossing-over is to exchange a part of the character string of the symmetric gene, and the mutation is to replace a part of the character string.

Accordingly, the gene in the present embodiment can be regarded as the joint order of the intermediate objects 16. Thus, the evaluation value can be made higher as the program size of the executable object 18 is reduced smaller.

Then, the flowchart in FIG. 3 will be explained. First, the initial value (minimum value) of the program size stored in the storing section 14 is input (step 10). The list of intermediate objects 16 is input (step 11). In this case, the initial value and the list are input by the input unit (not shown).

Then, the genes (having the linking order) of a predetermined number are formed, based on the list that has been input in step 11 (initialization of the genes) (step 12).

Subsequently, the linker 17 executes the linking process such as the linking of the intermediate objects 16, etc. based on one genes of a predetermined number that are formed first by the linking order forming section 11 to get the executable object 18 (step 13).

Then, the program size of the executable object 18 formed in step 13 and the minimum value (initial value) of the program size stored in the storing section 14 are compared with each other by the comparing section 13 (step 14). If the program size is not smaller than the minimum value, the process goes to step 17.

Since the initial value as a minimum value is a sufficiently large value and thus the program size is smaller than the minimum value (initial value), the process advances to step 15.

Since the program size is smaller than the minimum value (initial value), this program size is recorded as the minimum value and updated (step 15). Then, the linking order for this recorded program size is read out from the linking order section 11a, and then the linking order at this time is recorded in the storing section 14 (step 16).

Then, the process is returned to the linking order forming section 11 by the repeating section 15, and then step 13 to step 16 are repeated by the number of times equal to the number of the genes, against other genes out of the formed genes of the predetermined number (step 17).

After the processes are repeated by the number of times equal to the predetermined number of the genes, the crossing-over of the gene is executed based on the program size of the executable object formed by the linking process in step 13 (step 18). For example, if the program size is larger than a predetermined threshold value, the crossing-over of the gene is executed to provide the smaller program size.

Then, like step 18, the mutation of the gene is executed based on the program size calculated by the linking process in step 13 (step 19). For example, if the program size is larger than the predetermined threshold value, the mutation of the gene is executed to provide the smaller program size.

In this case, the order of steps 18, 19 may be set inversely and also the threshold value may be set separately.

The process is returned to step 13 after step 19 (step 20), and then step 13 to step 19 are repeated to execute the linking process and to form the executable object. In step 20, it is decided whether or not the formation of the linking order by the linking order forming section 11 should be ended. This decision of the end is made depending upon whether the process is returned to step 13 by a predetermined number of times or the program size calculated by the linking process in step 13 is reduced smaller than a predetermined value, and then the process goes to next step.

If the end decision is made in step 20, the minimum program size out of the formed executable objects 18 and the linking order at that time (at the time of minimum) are stored in the storing section 14. Therefore, the linking process of the intermediate objects 16 is performed by using the linking order at the time of minimum, and thus the executable object 18 that provides the minimum program size can be formed (step 21).

Accordingly, since no manual intervention is needed in the examination of the linking order of the intermediate objects 16, it does not take much time and labor to get the executable object 18 of the minimum size.

Also, even if there are numerous combinations of the linking orders of the intermediate objects 16, the linking order of the intermediate objects 16 that can provide the minimum program size can be effectively and easily obtained at the high speed by applying the genetic algorithm.

(Embodiment 2)

Configurations of a linker unit and peripheral devices according to the present embodiment will be explained with reference to FIG. 4.

Figure 4:
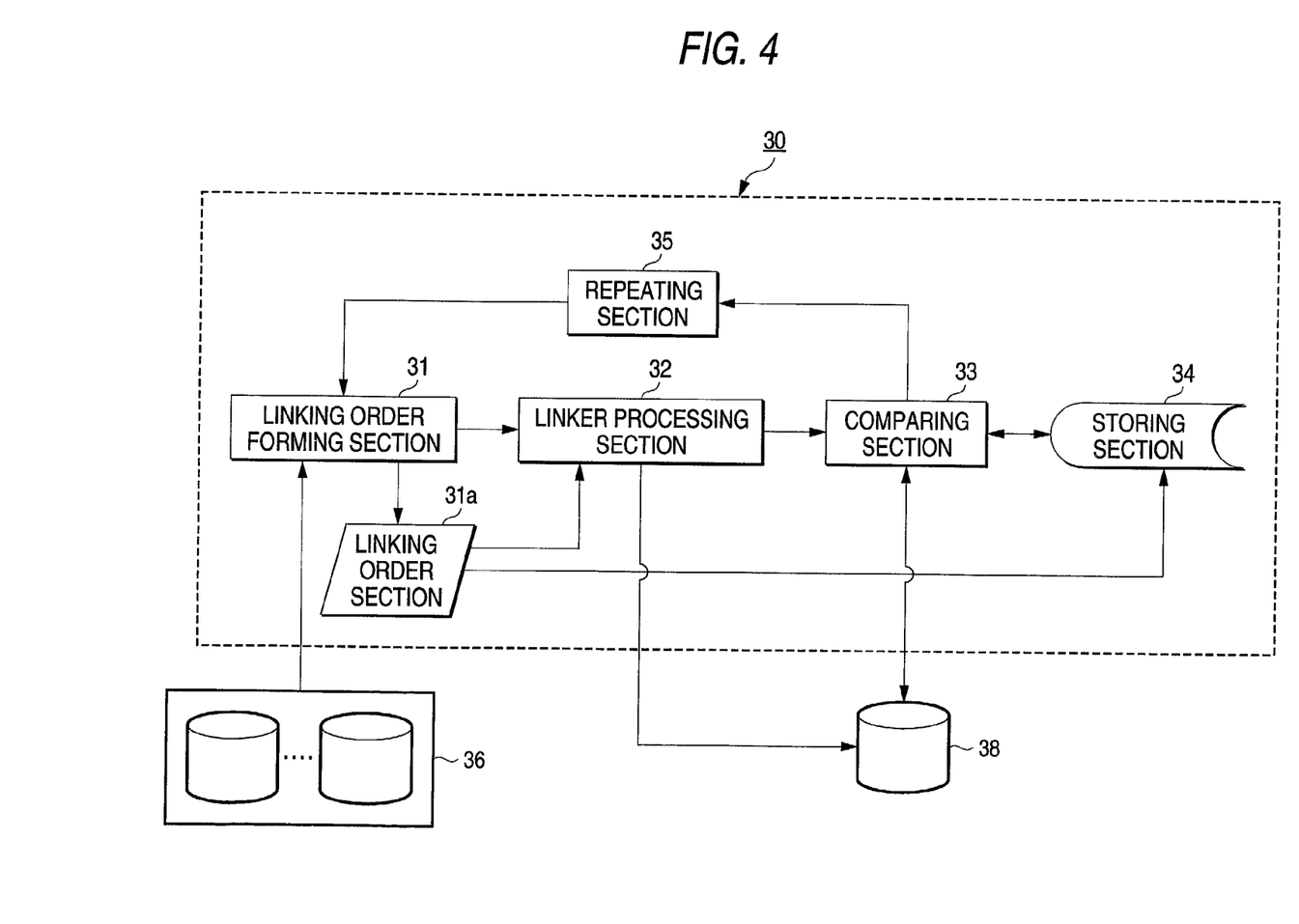
FIG. 4 is a view showing configurations of a linker unit and peripheral devices according to a second embodiment.

FIG. 4 is a view showing configurations of a linker unit and peripheral devices according to a second embodiment.

A linker unit 30 comprises a linking order forming section 31 as an intermediate object linking order forming means, a linker processing section 32 as a linker processing means, a comparing section 33 as a comparing means, a storing section 34 as a storing means, and a repeating section 35 as a repeating means.

The linking order forming section 31 is a unit that forms the linking order of the intermediate objects 16. The linking orders formed by the linking order forming section 31 are held by a linking order section 31a until the subsequent linking order is formed. The linker processing section 32 executes the linking process based on the linking orders held by the linking order section 31a to form the executable object 38.

Also, the linking order forming section 31 forms the linking orders, like the permutation algorithm and the genetic algorithm set forth in the first embodiment.

The linker processing section 32 executes the linking process based on the linking order formed by the linking order forming section 31 to form the executable object 38.

The comparing section 33 compares the program size of the executable object 38 formed by the linker processing section 32 with the program size of the executable objects stored in the storing section 34.

The storing section 34 stores the program size that is smaller in size according to the comparison in the comparing section 33, and updates it. Then, the storing section 34 stores the minimum program size out of the executable objects 38 formed by repeating respective steps by the repeating section 35 described later. Also, upon updating the smaller program size and recording it, the storing section 34 stores the linking order used when the executable object 38 having the program size is obtained from the linking order section 31a.

Accordingly, the minimum program size and the linking order of the intermediate objects 36 used when the executable object 38 having this minimum program size is obtained are stored in the storing section 34.

Also, it is preferable that the initial value of the program size should be input previously at the initial stage of the storing section 34. For example, a value having a size that is unavailable as the program size may be input as the initial value.

The repeating section 35 is a unit that causes the linking order forming section 31, the linker starting section 32, the comparing section 33, and the storing section 34 to repeat a series of steps by returning the step to the linking order forming section 31 again after the comparison in the comparing section 33.

The above is the internal configuration of the linker unit 30.

As the peripheral devices of the linker unit 30, there exist the intermediate object 36 and the executable object 38.

The executable object 38 contains the branch instruction, and this branch instruction has the different program size according to the branch distance. Also, if this branch distance becomes longer, the program size of the executable object becomes larger.

Also, since the branch distance is changed according to the linking order of the intermediate objects 36, the program size of the executable object 38 is changed based on the linking order of the intermediate objects 36.

The above is the configuration of the peripheral devices of the linker unit 30.

In this case, since operations in the case where the permutation algorithm is applied to the linker unit 30 and the case where the genetic algorithm is applied to the same are similar to the first embodiment, their explanation will be omitted.

Therefore, according to this linker unit 30, since no manual intervention is needed in the examination of the linking order of the intermediate objects 36, it does not take much time and labor to get the executable object 38 of the minimum size.

Also, even if there are numerous combinations of the linking orders of the intermediate objects 36, all linking orders of the intermediate objects 36 can be effectively formed by the permutation algorithm and then the linking order obtained at the time when the program size is minimum can be stored by the storing section 34. As a result, the linking order of the intermediate objects 36 that can provide the minimum program size can be easily obtained.

In addition, even if there are numerous combinations of the linking orders of the intermediate objects 36, the linking order of the intermediate objects 36 that can provide the minimum program size can be effectively and easily obtained at the high speed by applying the genetic algorithm.

(Embodiment 3)

Configurations of a compiler driving unit and peripheral devices according to the present embodiment will be explained with reference to FIG. 5.

Figure 5:
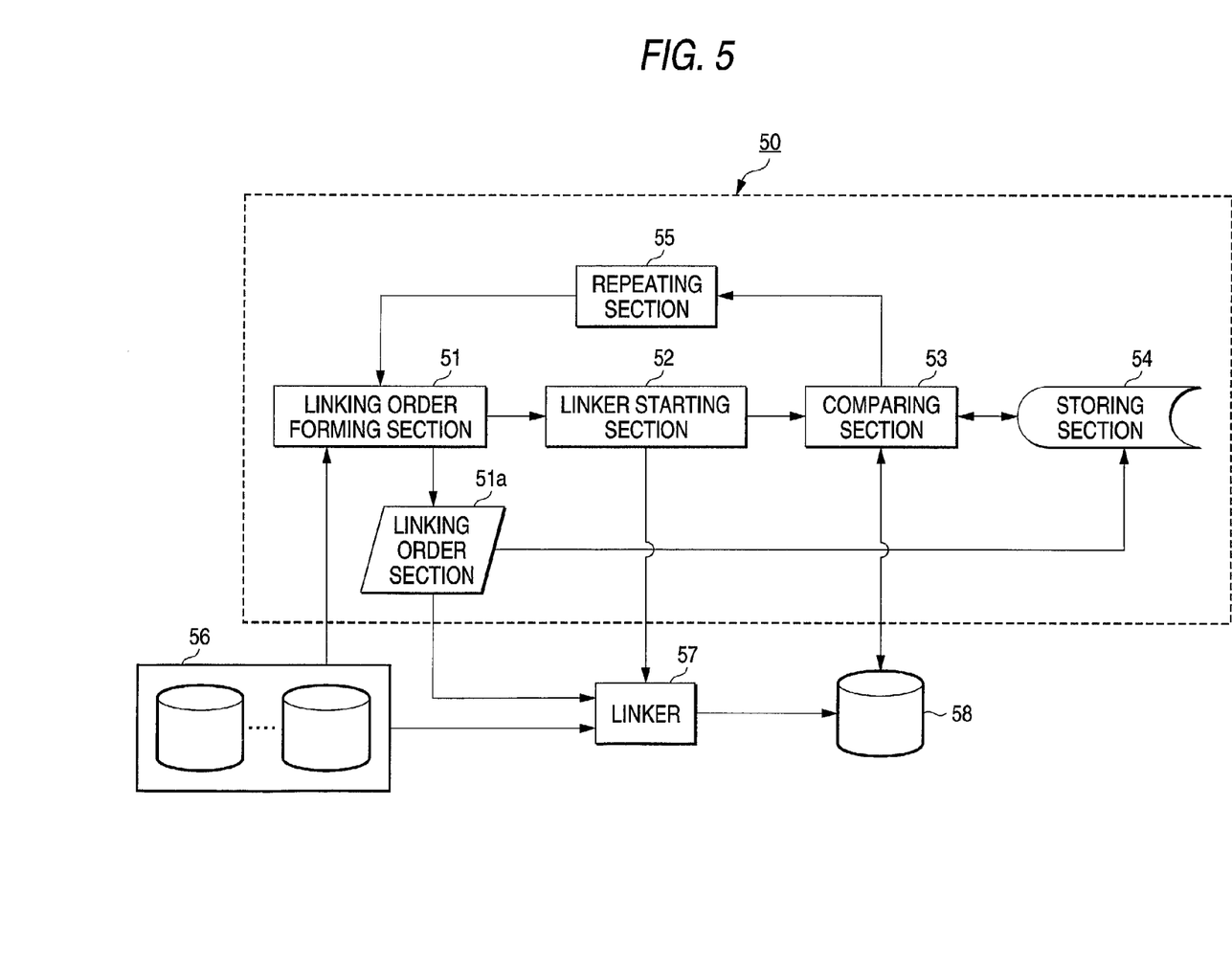
FIG. 5 is a view showing configurations of a compiler driving unit and peripheral devices according to a third embodiment.

FIG. 5 is a view showing configurations of a compiler driving unit and peripheral devices according to a third embodiment.

A compiler driving unit 50 comprises a linking order forming section 51 as an intermediate object linking order forming means, a linker starting section 52 as a linker starting means, a comparing section 53 as a comparing means, a storing section 54 as a storing means, and a repeating section 55 as a repeating means.

The linking order forming section 51 is a unit that forms the linking order of the intermediate objects 56. The linking orders formed by the linking order forming section 51 are held by a linking order section 51*a* until the subsequent linking order is formed. The linker starting section 52 starts the linker 57 based on the linking orders held by the linking order section 51*a* to cause it to execute the linking process, and thus the executable object 58 is formed.

Also, the linking order forming section 51 forms the linking orders, like the permutation algorithm and the genetic algorithm set forth in the first embodiment.

The linker starting section 52 starts the linker 57 based on the linking orders formed by the linking order forming section 51 to cause it to execute the linking process, whereby the executable object 58 is formed.

The comparing section 53 compares the program size of the executable object 58 formed by the linker 57 with the program size of the executable objects stored in the storing section 54.

The storing section 54 stores the program size that is smaller in size according to the comparison in the comparing section 53, and updates it. Then, the storing section 54 stores the minimum program size out of the executable objects 58 formed by repeating respective steps by the repeating section 55 described later. Also, upon updating the smaller program size and recording it, the storing section 54 stores the linking order used when the executable object 58 having the program size is obtained from the linking order section 51*a*.

Accordingly, the minimum program size and the linking order of the intermediate objects 56 used when the executable object 58 having this minimum program size is obtained are stored in the storing section 54.

Also, it is preferable that the initial value of the program size should be input previously at the initial stage of the storing section 34. For example, a value having a size that is unavailable as the program size may be input as the initial value.

The repeating section 55 is a unit that causes the linking order forming section 51, the linker starting section 52, the comparing section 53, and the storing section 54 to repeat a series of steps by returning the step to the linking order forming section 51 again after the comparison in the comparing section 53.

The above is the internal configuration of the compiler driving unit 50.

As the peripheral devices of the compiler driving unit 50, there exist the intermediate object 56, the linker 57, and the executable object 58.

The executable object 58 contains the branch instruction, and this branch instruction has the different program size according to the branch distance. Also, if this branch distance becomes longer, the program size of the executable object becomes larger.

Also, since the branch distance is changed according to the linking order of the intermediate objects 56, the program size of the executable object 58 is changed based on the linking order of the intermediate objects 56.

The above is the configuration of the peripheral devices of the compiler driving unit 50.

In this case, since operations in the case where the permutation algorithm is applied to the compiler driving unit 50 and the case where the genetic algorithm is applied to the same are similar to the first embodiment, their explanation will be omitted.

Therefore, according to this compiler driving unit 50, since no manual intervention is needed in the examination of the linking order of the intermediate objects 36, it does not take much time and labor to get the executable object 38 of the minimum size.

Also, even if there are numerous combinations of the linking orders of the intermediate objects 56, all linking orders of the intermediate objects 56 can be effectively formed by the permutation algorithm and then the linking order obtained at the time when the program size is minimum can be stored by the storing section 54. As a result, the linking order of the intermediate objects 56 that can provide the minimum program size can be easily obtained.

In addition, even if there are numerous combinations of the linking orders of the intermediate objects 56, the linking order of the intermediate objects 56 that can provide the minimum program size can be effectively and easily obtained at the high speed by applying the genetic algorithm.

According to the intermediate object linking unit of the present invention, since no manual intervention is needed in the examination of the linking order of the intermediate objects, it does not take much time and labor to get the executable object of the minimum size.

Also, even if there are numerous combinations of the linking orders of the intermediate objects, the linking order obtained at the time when the program size is minimum can be stored by the storing section. Therefore, the linking order of the intermediate objects that can provide the minimum program size can be easily obtained.

In addition, since all linking orders of the intermediate objects can be effectively formed by the permutation, the linking order of the intermediate objects that can provide the minimum program size can be easily obtained.

Furthermore, even if there are a large number of linking orders of the intermediate objects, the linking order of the intermediate objects that can provide the minimum program size can be effectively obtained at the high speed by applying the genetic algorithm.

What is claimed is:

1. An intermediate object linking method of linking a plurality of intermediate objects to form an executable object, said method performed by an apparatus, said method comprising:
   an intermediate object linking order forming step which decides linking orders of the plurality of intermediate objects;
   a linking processing step which executes linking processes of the plurality of intermediate objects based on the linking orders decided by the intermediate object linking order forming step to get an executable object;
   a comparing step which compares program size of the executable objects obtained by the linking processing step with the program size of a executable objects stored in a storing section every time when the linking order is changed;
   a storing step for storing the program size of the executable objects and the linking order obtained by the linking processing step in the storing section to update when the program size of the executable objects obtained by the linking processing step is smaller than the program size of the executable objects stored in the storing section at the comparing step; and
   a repeating step for changing the linking orders by the intermediate object linking order forming step and executing repeatedly the linking processing step, the comparing step, and the storing step,
   wherein a minimum program size of the executable object can be determined without any manual intervention being utilized in examining the linking orders of the intermediate objects.

2. An intermediate object linking method according to claim 1, wherein the intermediate object linking order forming step decides the linking orders by a permutation algorithm.

3. An intermediate object linking method according to claim 1, wherein the intermediate object linking order forming step decides the linking orders by a genetic algorithm.

4. An intermediate object linking unit for linking a plurality of intermediate objects to form an executable object, comprising:
   an intermediate object linking order forming section which decides linking orders of the plurality of intermediate objects;
   a linker starting section which executes linking processes of the plurality of intermediate objects based on the linking orders decided by the intermediate object linking order forming section to form an executable object;
   a comparing section which compares program size of the executable objects every time when the linking order is changed; a storing section which stores the program size of the executable objects and the linking order; and
   a repeating section which changes the linking orders by the intermediate object linking order forming section and
   operating repeatedly the linker starting section, the comparing section, and the storing section,
   wherein the comparing section compares the program size of the executable objects formed by the linker starting section with the program size of the executable objects stored in the storing section,
   wherein the storing section stores the program size of the executable objects and the linking order formed by the linker starting section when the program size of the executable objects formed by the linker starting section is smaller than the program size of the executable objects stored in the storing section at the comparison by the comparing section.

5. An intermediate object linking unit according to claim 4, wherein the intermediate object linking order forming section decides the linking orders by a permutation algorithm.

6. An intermediate object linking unit according to claim 4, wherein the intermediate object linking order forming section decides the linking orders by a genetic algorithm.

7. A linker unit for linking aplurality of intermediate objects to form an executable object, comprising:
   an intermediate object linking order forming section which decides linking orders of the plurality of intermediate objects;
   a linking processing section which executes linking processes of the plurality of intermediate objects based on the linking orders decided by the intermediate object linking order forming section to form an executable object;
   a comparing section which compares program size of the executable objects every time when the linking order is changed;
   a storing section which stores the program size of the executable objects and the linking order; and
   a repeating section which changes the linking orders by the intermediate object linking order forming section and operating repeatedly the linker starting section, the comparing section, and the storing section,
   wherein the comparing section compares the program size of the executable objects formed by the linker starting section with the program size of the executable objects stored in the storing section,
   wherein the storing section stores the program size of the executable objects and the linking order formed by the linker starting section when the program size of the executable objects formed by the linker starting section is smaller than the program size of the executable objects stored in the storing section at the comparison by the comparing section.

8. A linker unit according to claim 7, wherein the intermediate object linking order forming section decides the linking orders by a permutation algorithm.

9. A linker unit according to claim 7, wherein the intermediate object linking order forming section decides the linking orders by a genetic algorithm.

10. A compiler driving unit for translating a source program by starting one or more of a compiler, an assembler, and a linker to form an executable object, said unit comprising:

an intermediate object linking order forming section which decides linking orders of the plurality of intermediate objects;

a linker starting section which executes linking processes of the plurality of intermediate objects based on the linking orders decided by the intermediate object linking order forming section to form an executable object;

a comparing section which compares program size of the executable objects every time when the linking order is changed; a storing section which stores the program size of the executable objects and the linking order; and a repeating section which changes the linking orders by the intermediate object linking order forming section and operating repeatedly the linker starting section, the comparing section, and the storing section, wherein the comparing section compares the program size of the executable objects formed by the linker starting section with the program size of the executable objects stored in the storing section, and wherein the storing section stores the program size of the executable objects and the linking order formed by the linker starting section when the program size of the executable objects formed by the linker starting section is smaller than the program size of the executable objects stored in the storing section at the comparison by the comparing section.

11. A compiler driving unit according to claim 10, wherein the intermediate object linking order forming section decides the linking orders by a permutation algorithm.

12. A compiler driving unit according to claim 10, wherein the intermediate object linking order forming section decides the linking orders by a genetic algorithm.

13. A recording medium for recording a program for linking a plurality of intermediate objects to form an executable object, wherein the program for causing a computer to execute a method comprising:

an intermediate object linking order forming step which decides linking orders of the plurality of intermediate objects;

a linking processing step which executes linking processes of the plurality of intermediate objects based on the linking orders decided by the intermediate object linking order forming step to get an executable object;

a comparing step which compares program size of the executable objects obtained by the linking processing step with the program size of a executable objects stored in a storing section every time when the linking order is changed;

a storing step for storing the program size of the executable objects and the linking order obtained by the linking processing step in the storing section to update when the program size of the executable objects obtained by the linking processing step is smaller, than the program size of the executable objects stored in the storing section at the comparing step; and a repeating step for changing the linking orders by the intermediate object linking order forming step and executing repeatedly the linking processing step, the comparing step, and the storing step, wherein a minimum program size of the executable object can be determined without any manual intervention being utilized in examining the linking orders of the intermediate objects.

14. A recording medium according to claim 13, wherein the intermediate object linking order forming step decides the linking orders by a permutation algorithm.

15. A recording medium according to claim 13, wherein the intermediate object linking order forming step decides the linking orders by a genetic algorithm.

* * * * *